(12) United States Patent
Thuo et al.

(10) Patent No.: US 12,208,471 B2
(45) Date of Patent: Jan. 28, 2025

(54) SOLDER MATERIALS INCLUDING SUPERCOOLED MICRO-CAPSULES AND ALLOYED PARTICLES

(71) Applicant: THE INDIUM CORPORATION OF AMERICA, Clinton, NY (US)

(72) Inventors: Martin Thuo, Ames, IA (US); Ian Tevis, Ames, IA (US); Dana Drochner, Boone, IA (US)

(73) Assignee: THE INDIUM CORPORATION OF AMERICA, Clinton, NY (US)

( * ) Notice: Subject to any disclaimer, the term of this patent is extended or adjusted under 35 U.S.C. 154(b) by 37 days.

(21) Appl. No.: 18/065,356

(22) Filed: Dec. 13, 2022

(65) Prior Publication Data

US 2023/0182236 A1    Jun. 15, 2023

Related U.S. Application Data

(60) Provisional application No. 63/373,379, filed on Aug. 24, 2022, provisional application No. 63/265,344, filed on Dec. 13, 2021.

(51) Int. Cl.
| | |
|---|---|
| *B23K 35/02* | (2006.01) |
| *B22F 1/00* | (2022.01) |
| *B22F 1/16* | (2022.01) |
| *B22F 1/17* | (2022.01) |
| *B23K 35/26* | (2006.01) |

(52) U.S. Cl.
CPC ............ *B23K 35/0244* (2013.01); *B22F 1/09* (2022.01); *B22F 1/16* (2022.01); *B22F 1/17* (2022.01); *B23K 35/262* (2013.01); *B23K 35/264* (2013.01); *B22F 2301/30* (2013.01)

(58) Field of Classification Search
CPC .............. B23K 35/0244; B23K 35/262; B23K 35/264; B22F 1/17; B22F 2301/30; B22F 1/09; B22F 1/16
See application file for complete search history.

(56) References Cited

U.S. PATENT DOCUMENTS

| | | | |
|---|---|---|---|
| 2016/0317992 A1* | 11/2016 | Thuo ...................... | B82Y 40/00 |
| 2017/0014958 A1* | 1/2017 | Thuo ...................... | B22D 27/08 |
| 2018/0354037 A1* | 12/2018 | Thuo ...................... | H05K 3/125 |
| 2019/0203327 A1* | 7/2019 | Thuo ...................... | B22F 1/102 |

OTHER PUBLICATIONS

Durafuse LT, "Indium Corporation, Available Online at: https://www.indium.com/products/solders/solder-alloys/durafuse/", Dec. 2, 2021, 6 pages.

* cited by examiner

*Primary Examiner* — Adil A. Siddiqui
(74) *Attorney, Agent, or Firm* — Sheppard, Mullin, Richter & Hampton LLP

(57) ABSTRACT

A material includes a plurality of supercooled micro-capsules each including a metallic core in a liquid state at a temperature below a solidification temperature of the metallic core and further includes a metallic shell surrounding each respective metallic core. A plurality of alloyed metallic particles and flux are mixed with the plurality of supercooled micro-capsules to form a solder paste. Upon heating the solder paste, the plurality of alloyed particles melt. As the metallic shells destabilize, the liquid metallic cores interdiffuse with the melted alloyed particles forming a new alloy that has a higher melting temperature than the melting temperature of the alloyed metallic particles.

20 Claims, 6 Drawing Sheets

FIG. 4A  10 Wt% Field's metal, 90A

FIG. 4B  10 Wt% 98C

FIG. 4C  Negative control test (not undercooled)

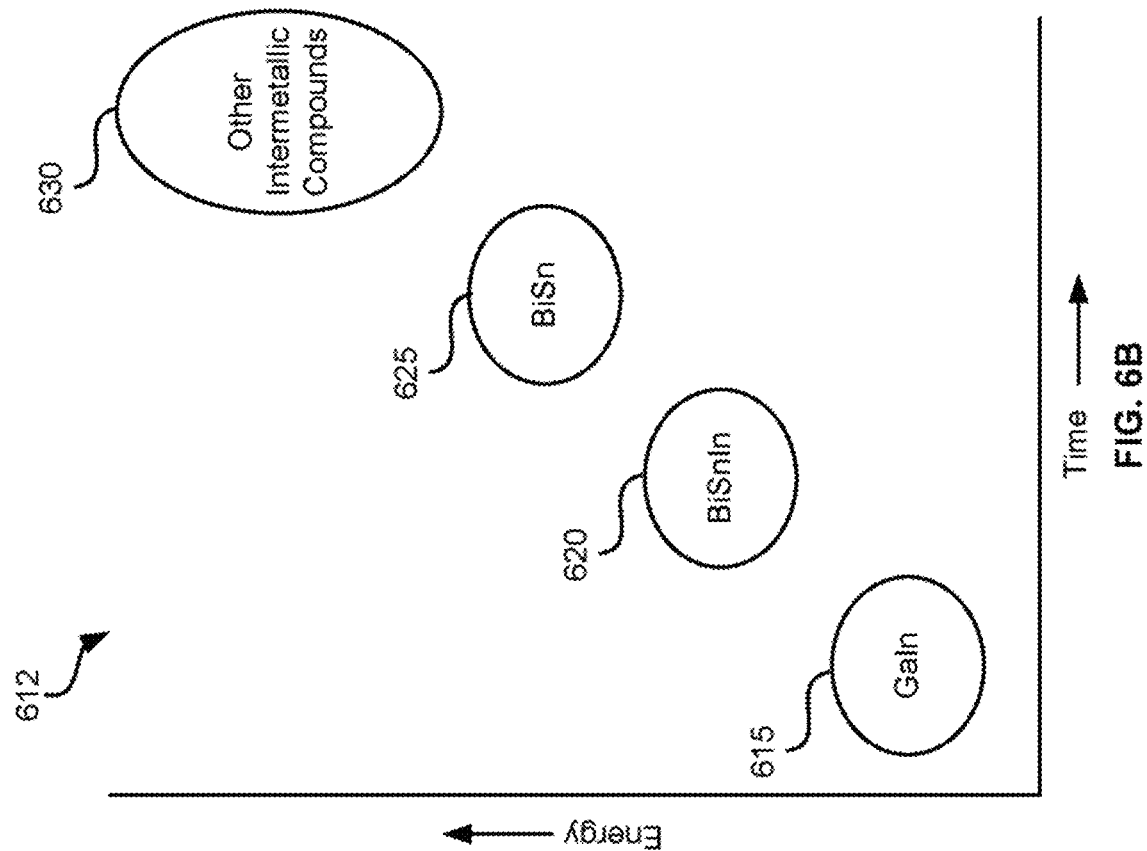
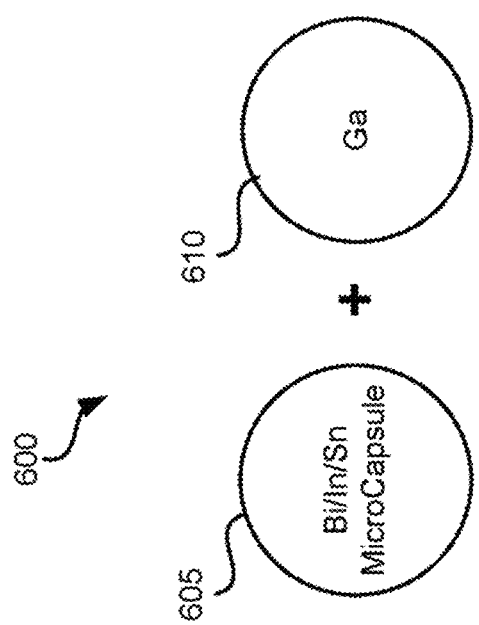

SOLDER MATERIALS INCLUDING SUPERCOOLED MICRO-CAPSULES AND ALLOYED PARTICLES

CROSS-REFERENCE TO RELATED APPLICATIONS

This application claims priority to U.S. Provisional Patent Application No. 63/265,344, filed on Dec. 13, 2021, entitled "SOLDER MATERIALS INCLUDING SUPERCOOLED MICRO-CAPSULES AND ALLOYED PARTICLES," and U.S. Provisional Patent Application No. 63/373,379 filed on Aug. 24, 2022, entitled "SOLDER MATERIALS INCLUDING SUPERCOOLED MICRO-CAPSULES AND ALLOYED PARTICLES" which are hereby incorporated by reference in their entirety.

BACKGROUND

The present invention relates to metal alloys for soldering, in particular for soldering electronic devices to a substrate.

The high temperature required to melt metal alloys to create solder joints can result in damage to electronic components, damage to the substrate and/or decreased reliability of the solder joint due to excessive intermetallic compound (IMC) formation and/or excessive diffusion of one or more metallization layers of the substrate. Processing solder materials at lower temperatures are needed to alleviate these issues.

SUMMARY

In some embodiments a material comprises a plurality of supercooled micro-capsules each including a metallic core in a liquid state at a temperature below a solidification temperature of the metallic core. The material further includes a plurality of alloyed metallic particles and a flux. In various embodiments each of the plurality of supercooled micro-capsules include a respective metallic shell in a solid-state. In some embodiments a dissolution of at least a portion of the metallic shells of the plurality of supercooled micro-capsules causes at least partial dissolution of the plurality of alloyed metallic particles, forming a resulting alloy. In various embodiments the dissolution occurs at a temperature above a melting temperature of the plurality of alloyed particles. In some embodiments the resulting alloy has a melting temperature above a melting temperature of the plurality of alloyed metallic particles. In various embodiments a percent by weight of the plurality of supercooled micro-capsules is less than a percent by weight of the plurality of alloyed metallic particles.

In some embodiments a method of forming a material comprises providing a plurality of supercooled micro-capsules each having a shell and a liquid metal core and providing a plurality of solid metallic particles having a melting point lower than a melting point of the shell. A mixture of the plurality of supercooled micro-capsules and the plurality of particles is created. In various embodiments when the mixture is heated to a temperature below a melting point of the shell, the plurality of solid metallic particles transition to a liquid state. In some embodiments while the solid metallic particles are within the liquid state, at least a portion of the shells of the plurality of particles are dissolved such that the liquid metal cores are intermixed with the plurality of solid metallic particles that are in a liquid state to create a resulting alloy. In various embodiments the resulting alloy has a melting temperature above a melting temperature of the plurality of solid metallic particles. In some embodiments the solid to liquid phase transformation occurs at a temperature below a melting temperature of the liquid metal core. In various embodiments a percent by weight of the plurality of supercooled micro-capsules is less than a percent by weight of the plurality of solid metallic particles.

In some embodiments a material comprises a plurality of micro-capsules each including a metallic shell surrounding a metallic core, wherein the metallic core is in a liquid state at a temperature below a solidification temperature of the metallic core, and a plurality of metallic particles in a solid state. In various embodiments the material further comprises a flux. In some embodiments at least a portion of metallic shells of the plurality of micro-capsules are configured to destabilize at a temperature equal to or above a melting temperature of the plurality of metallic particles. In various embodiments the destabilization of at least a portion of the metallic shells of the plurality of micro-capsules enables at least a portion of the metallic cores of the plurality of micro-capsules to intermix with at least a portion of the plurality of metallic particles that are in a liquid state to form an alloy. In some embodiments the alloy has a melting temperature that is greater than a melting temperature of the plurality of metallic particles. In various embodiments the micro-capsules are formed from a combination of bismuth, tin and indium. In some embodiments the plurality of metallic particles are formed from an alloy of bismuth, tin and indium. In various embodiments a percent by weight of the plurality of micro-capsules is less than a percent by weight of the plurality of metallic particles.

BRIEF DESCRIPTION OF THE DRAWINGS

FIGS. 6A and 6B illustrate a simplified example graphical illustration of the combination of a supercooled microcapsule and a solid particle that forms resulting compounds, according to embodiments of the disclosure;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some embodiments of the present disclosure relate to materials for forming soldered connections. More specifically, techniques disclosed herein relate to solder materials that include a combination of supercooled alloy micro-capsules and alloyed particles that can form a solder connection at relatively low temperatures (e.g., below a solidus temperature of the supercooled alloy). For example, in some embodiments a mixture of micro-capsules and alloyed particles can be heated within a flux environment to a temperature at, or above which, the alloyed particles melt. The shells of the microcapsules can become destabilized, releasing the liquid core to interdiffuse with the liquid alloyed particle material resulting in a new composition of liquid material. As the new composition is cooled, a new solid alloy can be formed which has a higher melting temperature than the alloyed particles. In another example, the shell of the micro-capsules can become thermodynamically unstable at a temperature below the melting point of the alloyed particles. As the shells destabilize, the liquid cores of the micro-capsules are released among the alloyed particles causing interdiffusion and mixing of the shell material, the liquid core material and the alloyed particle material to create a new alloy of the constituent materials. This new alloy may have a melting temperature that is higher than the alloyed particles. Various inventive embodiments are described herein, including methods, processes, systems, devices, and the like. The supercooled micro-capsules will first be described, followed by a description of the process for forming the solder material.

Some embodiments of the present disclosure relate to engineered thermodynamic relaxation of a material by using properties of an undercooled metal particle to create a new state and/or new compounds. These characteristics being tuned by the fragility of the undercooled liquid, composition, and/or chemical potential. The latter being dependent on degree of undercooling and the working temperature. The product of such a process being a joint, at least a three-component structure with one being an emergent phase, compound or microstructure.

Supercooled Micro-Capsules

Figure 1:
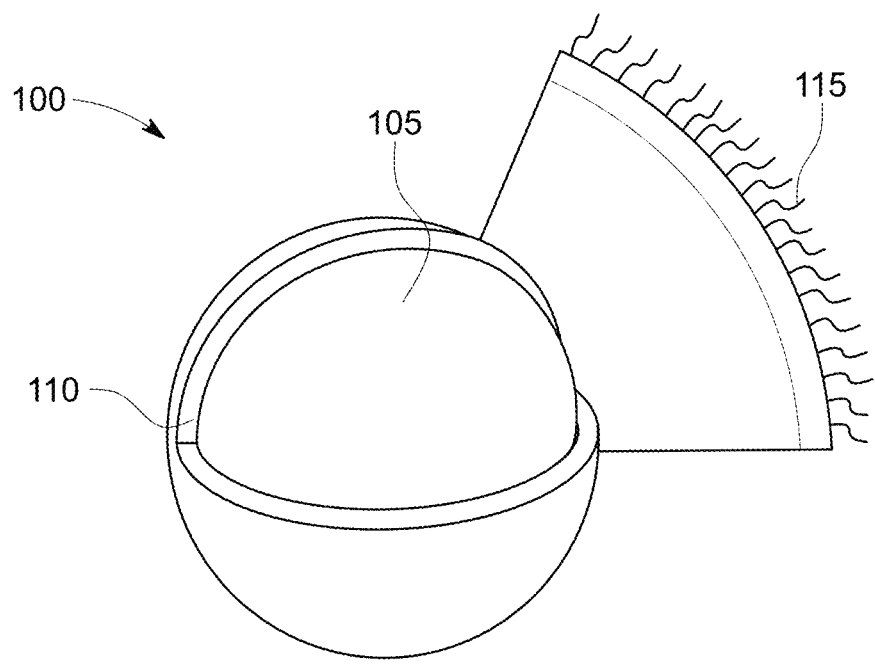
FIG. 1 is a diagram depicting a simplified partial cross-sectional view of a supercooled micro-capsule, according to embodiments of the disclosure.

FIG. 1 is a diagram depicting a simplified partial cross-sectional view of a supercooled micro-capsule 100 having an undercooled liquid metallic core 105 enclosed by a metal oxide shell 110, according to embodiments of the disclosure. In some embodiments shell 110 can prevent molten liquid metallic core 105 from transitioning to a solid when supercooled micro-capsule 100 is exposed to temperatures below the solidus temperature of the liquid metallic core by providing an interior surface free from nucleation sites and/or by creating a "thermodynamic tension" that increases an energy threshold for liquid to solid phase transformation to occur. As depicted in FIG. 1, shell 110 includes two layers 115, 120 that can each have a different composition, however other embodiments may have fewer or additional layers. In some embodiments shell 110 can be made from one, two, three or more layers where each layer can be defined by a predominant concentration of a different element. In further embodiments, shell 110 can be terminated with a ligand 125 or other liquid. Supercooled micro-capsule 100 is described in greater detail in co-owned and co-pending U.S. application Ser. No. 17/383,150 filed on Jul. 22, 2021, which is incorporated by reference herein in its entirety for all purposes.

Solder Material

Figure 2:
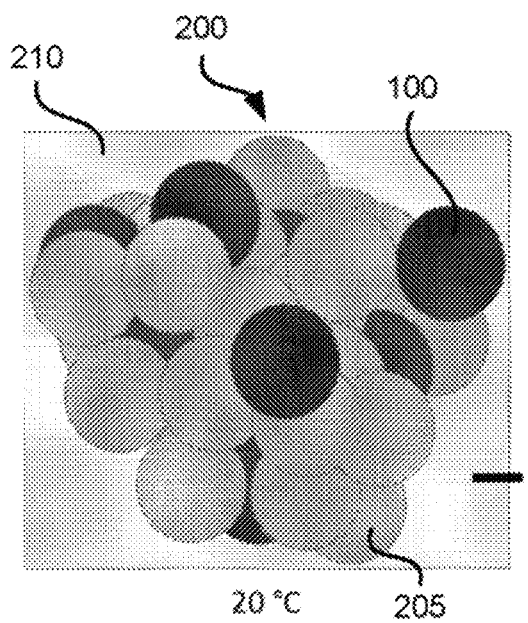
FIG. 2 is a simplified image illustrating the formation of a solder paste including supercooled micro-capsules and alloyed particles, according to embodiments of the disclosure.

FIG. 2 is a simplified image illustrating the formation of a soldering material (e.g., a solder paste) 200 including supercooled micro-capsules 100 and alloyed particles 205, according to embodiments of the disclosure. As shown in FIG. 2, supercooled micro-capsules 100 and alloyed particles 205 are dispersed within a flux 210 and/or ligand solution. In this particular embodiment, alloyed particles 205 can be in a solid phase at room temperature and may have a relatively low melting temperature, as described in more detail below. In other embodiments, alloyed particles 205 could also be supercooled liquid phase particles with a melting point below a melting point of supercooled micro-capsules 100. In yet another embodiment, alloyed particles 205 may not be an alloy and may be formed from a single metallic element.

In some embodiments, the weight percent of supercooled micro-capsules 100 in the combination of supercooled micro-capsules and alloyed particles 205 can be between 1 to 99 weight percent, between 5 to 50 weight percent, between 8 to 20 weight percent and in one embodiment can be approximately 10 weight percent. In some embodiments alloyed particles 205 are lower in weight percent as compared to supercooled micro-capsules 100. In one embodiment, alloyed particles 205 are less than 50 weight percent, or less than 20 weight percent or between 1 weight percent and 20 weight percent of solder paste 200. In another embodiment the weight percent of allowed particles is between 90 weight percent and 99.9 weight percent, while in another embodiment the weight percent of allowed particles is between 95 weight percent and 99 weight percent.

In some embodiments a melting temperature of alloyed particles 205 can be below a melting temperature of supercooled micro-capsules 100, while in other embodiments any suitable melting temperature can be selected for the alloyed particles and the supercooled micro-capsules. In one example, a solder paste 200 is formed by mixing the supercooled alloy particles and the low melting alloy particles with a flux paste vehicle. When the mixture is heated above the melting temperature of alloyed particles 205, the alloyed particles transform to a liquid state. Further heating in the presence of the flux 210 and molten low melting point alloy will dissolve the shell 110 (see FIG. 1) of supercooled micro-capsules 100, leaving the liquid core encapsulated in flux 210 at a temperature below the solidus temperature of the metal alloy. Flux 210 can also temporarily encapsulate the liquefied alloyed particles 205 until they coalesce with other liquefied alloyed particles or with supercooled micro-capsules 100. Because both materials are in a liquid state they readily interdiffuse to create a new alloy which is a combination of the composition of supercooled micro-capsules 100 and alloyed particles 205.

Liquefied alloyed particles 205 can function as a catalyst and can absorb micro-capsules 100 without transforming to a solid. If alloyed particles 205 are supercooled particles, the shell may be more dissolvable than the shells of micro-capsules 100, to facilitate the formation of the alloy. The new alloy solidifies when the composition reaches a composition (via the aforementioned interdiffusion process) and/or when the ambient temperature is lowered and nucleation is initiated. In various embodiments flux 210 can be selected to activate at a particular temperature range determined by the composition of supercooled micro-capsules 100 and alloyed particles 205. In some embodiments a melting temperature of the alloyed particles is below a melting temperature of the shell of the supercooled micro-capsules and in various embodiments the melting temperature of the alloyed particles is below a melting temperature of the liquid core of the supercooled micro-capsules.

Figure 3:
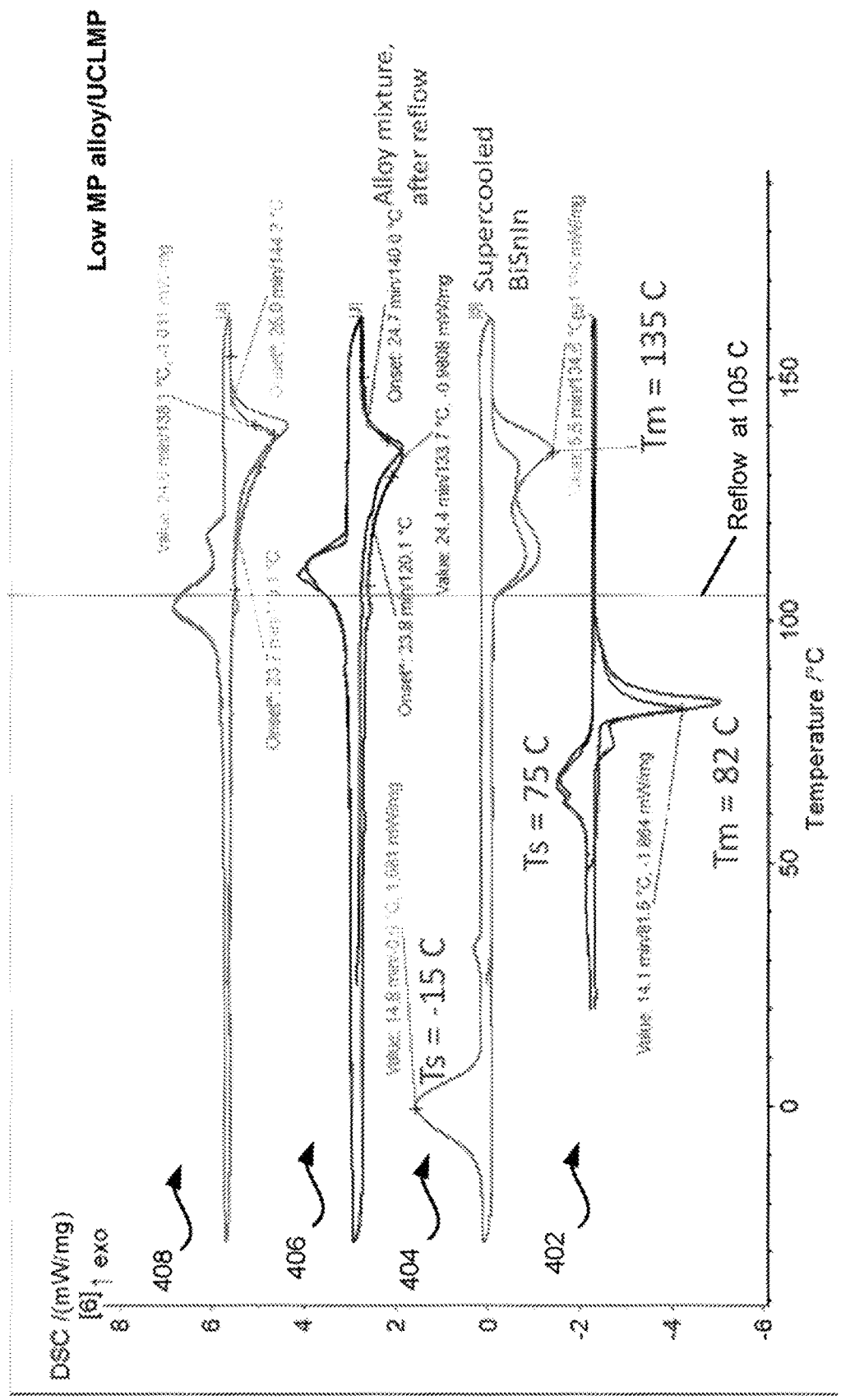
FIG. 3 is a DSC graph of various soldering alloys, according to embodiments of the disclosure.

FIG. 3 is a Differential Scanning Calorimetry (DSC) graph of various example solder alloys, according embodiments of the disclosure. As shown in FIG. 3, curve 402 is one example of alloyed particles (e.g., SnBiIn with a composition of between 20%-30% by weight of In). The melting temperature for this material is approximately 82° C. and the solidification temperature is approximately 75° C.

Curve 404 is a DSC graph of supercooled BiSnIn micro-capsules showing a melting temperature of approximately 135° C. and a solidification temperature of approximately −15° C. Curve 406 is a mixture of the materials used for curve 402 and curve 404. More specifically, curve 406 is a combination of approximately 10% by weight of alloyed particles of SnBiIn (curve 402) and 90% by weight of supercooled BiSnIn micro-capsules (curve 404), after an initial reflow was performed at 105° C. Thus, DSC curve 406 is the resulting combined (e.g., interdiffused) alloy showing a melting temperature of approximately 135° C. and a solidification temperature of approximately 110° C. Thus, a resulting alloy having a melting temperature of approximately 135° C. was formed at a solder reflow temperature of only 105° C., enabling the soldering operation to be performed at 30° C. below the melting temperature of the alloy. Curve 408 is similar to curve 404, however in this embodiment a Field's metal alloy (51 weight % In content) was used.

In some embodiments the lower reflow temperature may result in a reduced quantity of intermetallic compounds that form at the solder/metal interface on the substrate and the electronic component. In addition, the lower reflow temperature may result in a reduced amount of scavenging (i.e., interdiffusion) of metallization layers used on the substrate or the electronic component into the solder joint. In one embodiment silver or gold can be used on the substrate and the lower soldering temperature may result in reduced interdiffusion of the silver or gold into the solder, resulting in reduced embrittlement of the solder joint and/or improved bonding of the solder material to the components. Further, the reduced reflow temperature may result in improved reliability of the substrate and/or electronic component.

Figure 4:
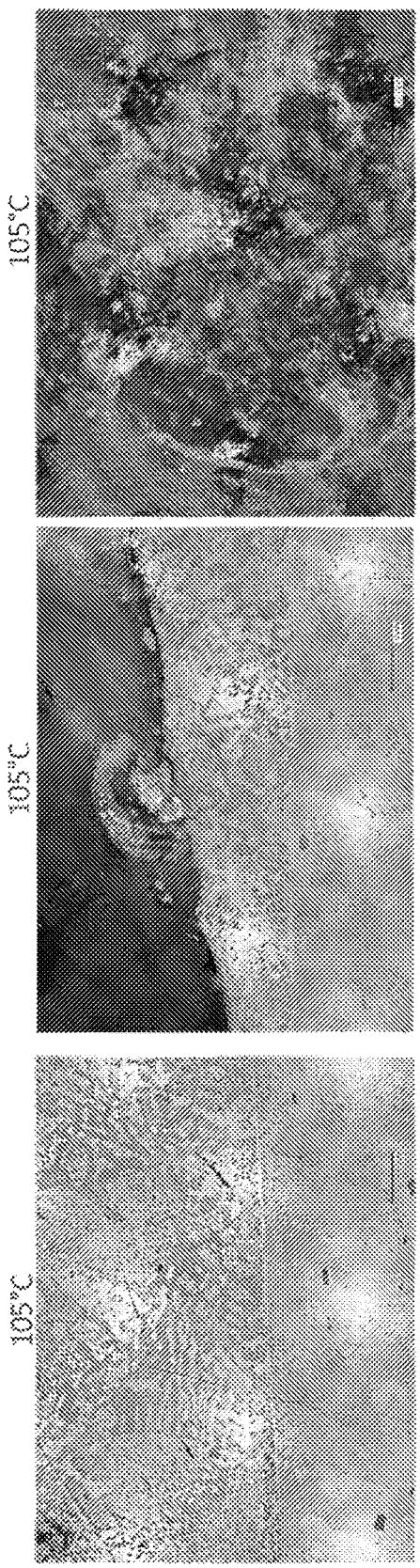
FIGS. 4A and 4B are cross-sections of solder joints showing the microstructure of solder alloys, according to embodiments of the disclosure.
FIG. 4C is a microscopic image of a control test, according to embodiments of the disclosure.

FIGS. 4A and 4B are microscopic images of the microstructure of solder joints formed on a copper substrate at 105° C., according to embodiments of the disclosure. FIG. 4A is a solder joint formed with the material of curve 408 of FIG. 4 (with Field's metal included). FIG. 4B is a solder joint formed with the material of curve 406 of FIG. 4. FIG. 4C is a control experiment using solid particles instead of supercooled micro-capsules, mixed with the low melting alloy. The results show that during reflow, coalescence of the particles did not occur and that without supercooled microcapsules, the coalescence and interdiffusion does not occur.

Figure 5:
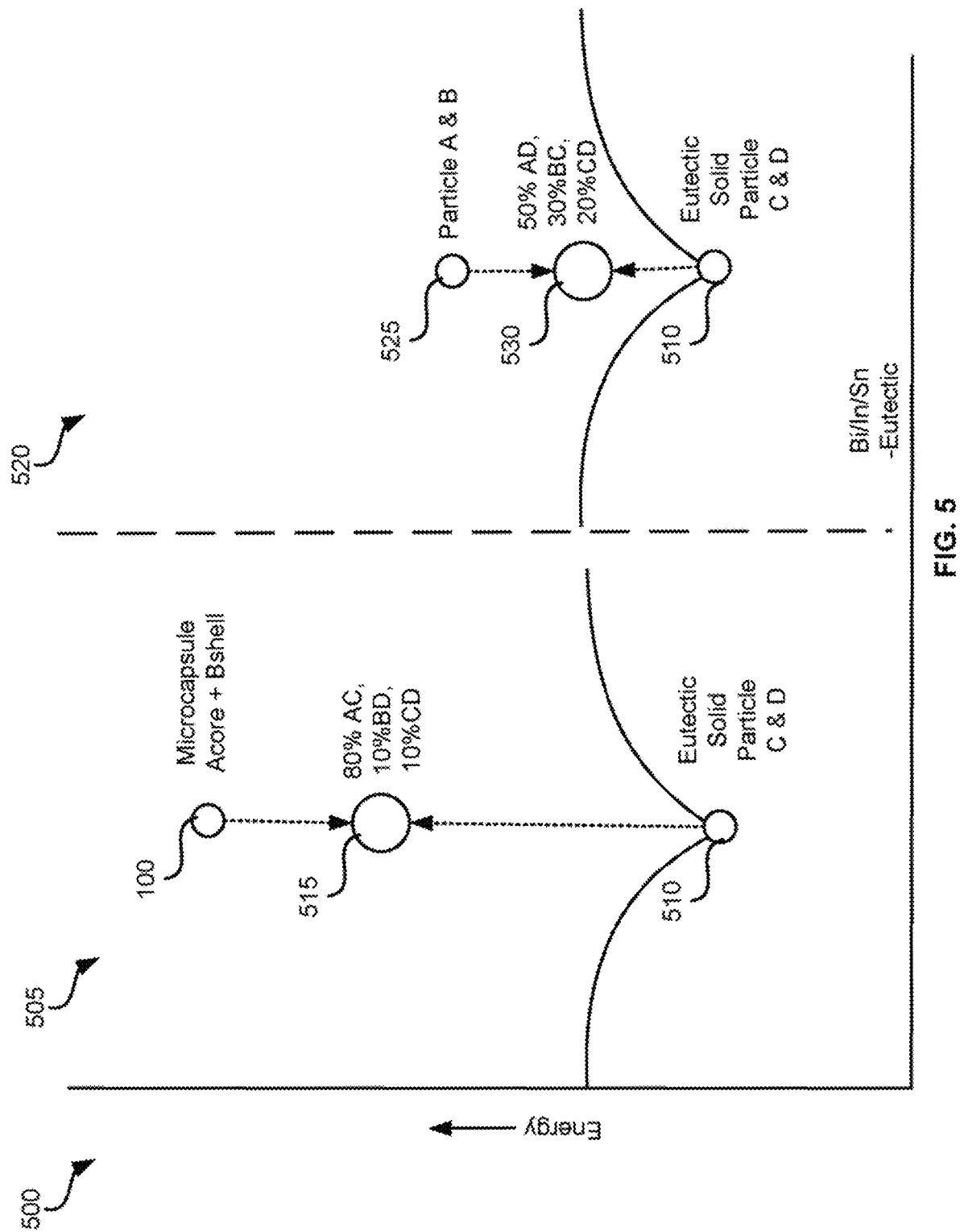
FIG. 5 illustrates an energy diagram of the combination of a supercooled micro-capsule and a solid particle to create a new combined particle according to embodiments of the disclosure.

FIG. 5 illustrates an energy diagram 500 of the combination of a supercooled micro-capsule 100 and solid particle 510 to create a new combined particle 515. As shown in section 505, supercooled micro-capsule 100 is combined with solid particle 510 which in this case is a eutectic composition of two elements, however, in other embodiments the solid particle can be a non-eutectic or eutectic composition of one, two, three or more elements. The combination of supercooled micro-capsule 100 and solid particle 510 can result from heating the combination of particles within a flux environment, as described above, however other suitable methods of combining the particles can also be used and are within the scope of this disclosure. For example, in another embodiment they may be heated in a gas environment that includes one or more reducing species.

In some embodiments combined particle 515 may include one or more compounds that are formed from one or more elements in supercooled micro-capsule 100 (e.g., elements A & B) and one or more elements in solid particle 510 (e.g., elements C & D) where A, B, C and D are each elements. In some embodiments A, B, C and D are each unique elements while in other embodiments one or more may be the same element. The one or more compounds that are formed can be determined by the elements within supercooled micro-capsule 100 and within solid particle 510, but also by the energy states of the two particles. More specifically, in some embodiments supercooled micro-capsule 100 can have one or more elements at relatively high energy states due to the frustrated phase transformation (e.g., thermodynamic tension) within the particle. For example in one embodiment supercooled micro-capsule 100 may include a lead core retained in a liquid state by a silver shell. Solid particle 510 may include a tin bismuth eutectic composition. In some embodiments solid particle 510 may be at a relatively low energy state, especially when the elements have a eutectic composition as shown in FIG. 5. The energy states of supercooled micro-capsule 100 and solid particle 510 may influence the composition of the compounds and the relative concentration of the compounds formed in combined particle 515, as described in more detail herein.

Comparatively, section 520 of diagram 500 shows a combination of a non-supercooled particle 525 (that has the same composition as supercooled particle 100) with solid particle 510. As shown in FIG. 5, non-supercooled particle 525 has significantly less energy than supercooled particle 100 that has the same elemental composition. Thus, the combination of non-supercooled particle 525 with solid particle 510 yields a combined particle 530 with a different composition and ratios of compositions than combined particle 515. Thus, combined particles 515 and 530 may have different properties which are due to the different energy states of supercooled particle 100 and non-supercooled particle 525. The combination of supercooled particle 100 and a solid particle 510 yields a combined particle 515 with an energy state that is in between the supercooled particle and the solid particle, or below an energy state of the solid particle.

FIG. 6A illustrates a simplified example graphical illustration 600 of the combination of a supercooled microcapsule 605 and a solid particle 610 which forms resulting compounds 612 shown in FIG. 6B, according to embodiments of the disclosure. As shown in FIG. 6A a supercooled microcapsule 605 includes bismuth, indium and tin and solid particle includes gallium. As shown in FIG. 6B, the resulting compounds 612 of this combination are shown graphically in an energy vs. time illustration. The first compound to form is typically the lowest energy combination of the elements. In one example gallium will start harvesting indium to form a eutectic GaIn compound 615 that is relatively low in energy. As time progresses and some diffusion is allowed to occur, the remaining bismuth, tin and indium form a eutectic Field's metal compound 620. With additional time some of the remaining bismuth and tin may form a eutectic bismuth tin compound 625. Finally, the residual elements may form one or more intermetallic compounds 630 which may be non-eutectic.

Figure 8:
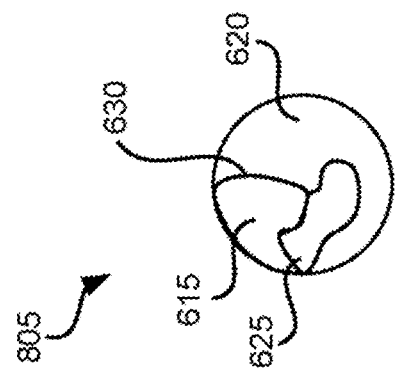
FIG. 8 illustrates an example microstructure of the different compounds formed in FIG. 6 manifested within an example combined particle.
Figure 7:
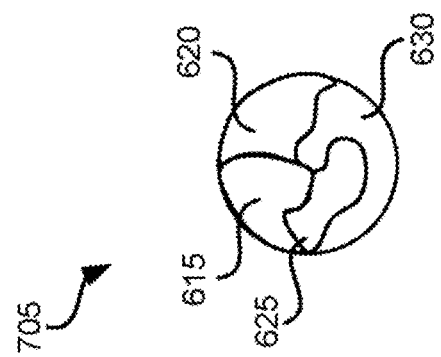
FIG. 7 illustrates an example microstructure of the different compounds formed in FIG. 6 manifested within an example combined particle.

FIG. 7 illustrates one example microstructure of how the different compounds formed in FIGS. 6A and 6B can be manifested within an example combined particle 705. As shown in FIG. 7, combined particle 705 includes four separate phases including eutectic GaIn compound 615, eutectic Field's metal compound 620, bismuth tin compound 625 and one or more intermetallic compounds 630. In an alternate formation of a combined particle 805 shown in FIG. 8, the resulting particle can include three separate phases including eutectic GaIn compound 615, eutectic Field's metal compound 620 and bismuth tin compound 625 each separated by one or more intermetallic compounds 630 at the grain boundaries. One of skill in the art having the benefit of this disclosure will appreciate the other configurations that are possible by mixing at least two separate particles where one is a supercooled microcapsule and the other is a unary, binary, ternary, etc. particle and where the result is a new mixture that includes one or more unary, binary and/or ternary compounds within the new mixture having energy states that are in-between or below the starting particles.

In some embodiments one or more of the particles can be similar to those described in Nature Communications volume 5, Article number: 4616 (2014) PNAS Sep. 18, 2018, 115 (38) 9444-9449 J. Phys. Chem. Lett. 2014, 5, 7, 1170-1174, which is incorporated by reference in its entirety herein for all purposes.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A material comprising:
    a plurality of supercooled micro-capsules each including
        a metallic core in a liquid state at a temperature below
        a solidification temperature of the metallic core;
    a plurality of alloyed metallic particles; and
    a flux.

2. The material of claim 1 wherein each of the plurality of supercooled micro-capsules include a respective metallic shell in a solid-state.

3. The material of claim 2 wherein a dissolution of at least a portion of the metallic shells of the plurality of supercooled micro-capsules causes at least partial dissolution of the plurality of alloyed metallic particles, forming a resulting alloy.

4. The material of claim 3 wherein the dissolution occurs at a temperature above a melting temperature of the plurality of alloyed metallic particles.

5. The material of claim 3 wherein the resulting alloy has a melting temperature above a melting temperature of the plurality of alloyed metallic particles.

6. The material of claim 1 wherein a percent by weight of the plurality of supercooled micro-capsules is less than a percent by weight of the plurality of alloyed metallic particles.

7. A method of forming a material comprising:
providing a plurality of supercooled micro-capsules each having a shell and a liquid metal core;
providing a plurality of solid metallic particles having a melting point lower than a melting point of the shell; and
creating a mixture of the plurality of supercooled micro-capsules and the plurality of solid metallic particles.

8. The method of claim 7, wherein when the mixture is heated to a temperature below a melting point of the shell, the plurality of solid metallic particles transition to a liquid state.

9. The method of claim 8 wherein while the solid metallic particles are within the liquid state, at least a portion of the shells of the plurality of solid metallic particles are dissolved such that the liquid metal cores are intermixed with the plurality of solid metallic particles that are in a liquid state to create a resulting alloy.

10. The method of claim 9 wherein the resulting alloy has a melting temperature above a melting temperature of the plurality of solid metallic particles.

11. The method of claim 8 wherein the solid to liquid phase transformation occurs at a temperature below a melting temperature of the liquid metal core.

12. The method of claim 7 wherein a percent by weight of the plurality of supercooled micro-capsules is less than a percent by weight of the plurality of solid metallic particles.

13. A material comprising:
a plurality of micro-capsules each including a metallic shell surrounding a metallic core, wherein the metallic core is in a liquid state at a temperature below a solidification temperature of the metallic core; and
a plurality of metallic particles in a solid state.

14. The material of claim 13 further comprising a flux.

15. The material of claim 13 wherein at least a portion of metallic shells of the plurality of micro-capsules are configured to destabilize at a temperature equal to or above a melting temperature of the plurality of metallic particles.

16. The material of claim 15 wherein the destabilization of at least a portion of the metallic shells of the plurality of micro-capsules enables at least a portion of the metallic cores of the plurality of micro-capsules to intermix with at least a portion of the plurality of metallic particles that are in a liquid state to form an alloy.

17. The material of claim 16 wherein the alloy has a melting temperature that is greater than a melting temperature of the plurality of metallic particles.

18. The material of claim 13 wherein the micro-capsules are formed from a combination of bismuth, tin and indium.

19. The material of claim 13 wherein the plurality of metallic particles are formed from an alloy of bismuth, tin and indium.

20. The material of claim 13 wherein a percent by weight of the plurality of micro-capsules is less than a percent by weight of the plurality of metallic particles.

* * * * *